(12) United States Patent
Wang et al.

(10) Patent No.: US 9,760,805 B2
(45) Date of Patent: Sep. 12, 2017

(54) IDENTIFYING VISUAL STORM SIGNATURES FROM SATELLITE IMAGES

(71) Applicant: The Penn State Research Foundation, University Park, PA (US)

(72) Inventors: James Z. Wang, State College, PA (US); Yu Zhang, Chicago, IL (US); Stephen Wistar, Lemont, PA (US); Michael A. Steinberg, State College, PA (US); Jia Li, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 7 days.

(21) Appl. No.: 14/879,758

(22) Filed: Oct. 9, 2015

(65) Prior Publication Data

US 2016/0104059 A1    Apr. 14, 2016

Related U.S. Application Data

(60) Provisional application No. 62/062,622, filed on Oct. 10, 2014.

(51) Int. Cl.
*G06K 9/00* (2006.01)
*G01W 1/00* (2006.01)
(Continued)

(52) U.S. Cl.
CPC ............... *G06K 9/66* (2013.01); *G01W 1/00* (2013.01); *G06K 9/0063* (2013.01);
(Continued)

(58) Field of Classification Search
CPC ............ G06K 9/00; G06T 7/00; H04N 21/00
(Continued)

(56) References Cited

U.S. PATENT DOCUMENTS 5,379,215 A    1/1995  Kruhoeffer et al.
6,339,747 B1 *  1/2002  Daly ..................... G01W 1/10
                                                702/3
(Continued)

OTHER PUBLICATIONS

Barry, R. et al., *Atmosphere, Weather and Climate*, 2009.
Bouguet, J., Pyramidal implementation of the affine lucas kanade feature tracker description of the algorithm, Intel Corporation, 5, 2001.
Breiman, L., Random forests, *Machine Learning*, 45(1): 5-32, 2001.
Carlson, T., Airflow through midlatitude cyclones and the comma cloud pattern, *Monthly Weather Review*, 108(10): 1498-1509, 1980.
(Continued)

*Primary Examiner* — Abolfazl Tabatabai
(74) *Attorney, Agent, or Firm* — Dinsmore & Shohl LLP

(57) ABSTRACT

Satellite images from vast historical archives are analyzed to predict severe storms. We extract and summarize important visual storm evidence from satellite image sequences in a way similar to how meteorologists interpret these images. The method extracts and fits local cloud motions from image sequences to model the storm-related cloud patches. Image data of an entire year are adopted to train the model. The historical storm reports since the year 2000 are used as the ground-truth and statistical priors in the modeling process. Experiments demonstrate the usefulness and potential of the algorithm for producing improved storm forecasts. A preferred method applies cloud motion estimation in image sequences. This aspect of the invention is important because it extracts and models certain patterns of cloud motion, in addition to capturing the cloud displacement.

15 Claims, 4 Drawing Sheets

(51) Int. Cl.
　　　*G06K 9/66*　　　(2006.01)
　　　*G06K 9/46*　　　(2006.01)
　　　*G06T 7/20*　　　(2017.01)

(52) U.S. Cl.
　　CPC .......... *G06K 9/00335* (2013.01); *G06K 9/46* (2013.01); *G06T 7/20* (2013.01); *G06T 2207/10032* (2013.01); *G06T 2207/30192* (2013.01)

(58) Field of Classification Search
　　USPC ......... 382/103, 107, 236; 345/419; 348/169; 702/3
　　See application file for complete search history.

(56) References Cited

U.S. PATENT DOCUMENTS

| | | | |
|---|---|---|---|
| 6,683,609 B1 | 1/2004 | Thompson et al. | |
| 7,062,066 B2 * | 6/2006 | Wolfson | G01S 13/86 382/100 |
| 8,818,029 B1 * | 8/2014 | Mecikalski | G01W 1/10 382/103 |
| 2003/0156734 A1 | 8/2003 | Wolfson et al. | |

OTHER PUBLICATIONS

Charney, J., the dynamics of long waves in a baroclinic westerly current, *Journal of Meteorology*, 4(5): 136-162, 1947.

Earth location user's guide (elug). rev. 1, noss/osd3-1998-015r1ud0, Tech. Rep. NOAA/NESDIS DRL 504-11, 1998.

Green, S., *Fluid Vortices: Fluid Mechanics and Its Applications*, 30, 1995.

Hunt, J. et al., Eddies, streams, and convergence zones in turbulent flows, *Studying Turbulence Using Numerical Simulation Databases*, 1: 193-208.

Lucas, B. et al., An iterative image registration technique with an application to stereo vision, *Proceedings of the International Joint Conferences on Artificial Intelligence*, 81: 674-679, 1981.

McGovern, A. et al., Open problem: dynamic relational models for improved hazardous weather prediction, *Proceedings of ICML Workshop on Open Problems in Statistical Relational Learning*, 29, 2006.

Stam, J., Stable fluids, Proceedings of the 26th Annual Conference on Computer Graphics and Interactive Techniques, 1999, pp. 121-128.

\* cited by examiner

IDENTIFYING VISUAL STORM SIGNATURES FROM SATELLITE IMAGES

REFERENCE TO RELATED APPLICATION

This application claims priority to U.S. Provisional Patent Application Ser. No. 62/062,622, filed Oct. 10, 2014, the entire content of which is incorporated herein by reference.

GOVERNMENT SUPPORT

This invention was made with government support under Grant No. OCI1027854, awarded by the National Science Foundation. The Government has certain rights in the invention.

FIELD OF THE INVENTION

This invention relates generally to weather prediction and, in particular, to the prediction of severe storms based on the processing and analysis of current and past satellite image data.

BACKGROUND OF THE INVENTION

Extreme weather events, such as thunderstorms, hails, hurricanes, and tornadoes, cause a significant amount of damage every year worldwide. In the United States, it is reported by the National Climate Data Center (NCDC)[1] that there are eleven extreme weather events with at least a billion dollars' loss in 2012, causing a total of 377 deaths, which is the second most disastrous year in the recorded history. That said, much of the loss was due to a lack of proper precautions and could be avoided with a reliable severe weather warning system.

[1] http://www.ncdc.noaa.gov/billions

Though meteorologists dedicate to making accurate weather forecasts with advanced computational technologies, the long-term prediction of severe storms is still not sufficiently accurate or reliable. In weather forecasting, computers are commonly applied to solve numerical models about weather systems, which are in essence partial differential equations (PDEs) that calculate the future conditions of a weather system from an initial condition. Due to the nonlinear and chaotic nature of numerical models, some tiny noises in the initial values can result in large differences in the predictions. This is commonly known as the butterfly effect. As a result, although nowadays powerful computers are used to run complex numerical models, it is difficult to get accurate predictions, especially in mid-to-long-teini forecasting.

The numerical methods can efficiently process large amounts of meteorological measurements. However a major drawback of such methods is that they do not interpret the data from a global point of view at a high cognitive level. For instance, meteorologists can make good judgments of the future weather conditions by looking at the general cloud layout and developing trend from a sequence of satellite cloud images using domain knowledge and experience. Numerical methods do not capture such high-level clues. Additionally, historical weather records provide valuable references for making weather forecasts, but numerical methods do not make good use of them.

SUMMARY OF THE INVENTION

Without using any sensory measurements commonly used in numerical weather forecasting, such as temperature or air pressure, this invention uses historical storm reports and satellite image archives to predict storms. The computational weather forecasting system and method automatically analyzes visual features from satellite images to extract high-level storm signatures, and fuses that information with historical meteorological records to generate accurate storm predictions.

The properties of optical flows between adjacent images in an image sequence are used to determine rotations in the flow field indicative of storm patterns. Recognizing that vortex detection from the optical flow, by itself, is insufficient in making reliable predictions, a statistical model trained from historical meteorological data, together with the satellite image visual features, further selects the extracted vortexes and removes vortexes not related to storms.

In accordance with the invention, a sequence of satellite images and historical meteorological data are received in conjunction with a particular geographical region. A programmed computer is used to automatically extract visual features indicative of storm signatures from the sequence of satellite images, and the extracted visual features and the historical meteorological data are together used to predict storms in the geographical region. More particularly, the historical meteorological data, the satellite image archives, or both, are used to identify correspondences between the visual image signatures and the occurrences of current and future storms.

The preferred embodiments include the step of estimating cloud motion in the image sequences to determine dynamic areas having a storm potential. The step of estimating cloud motion in the image sequences includes automatically analyzing the optical flow between adjacent satellite images or among a contiguous sequence of satellite images. Rotation, divergence, and/or velocity of the optical flow in a local area may then be used to model potential storm patterns.

The method may include the steps of extracting and fitting local cloud motions from image sequences to model storm-related cloud patches, and/or identifying a dense optical flow field between two adjacent images or within a contiguous sequence of the satellite images. The step of using the flow field may be used to identify local vortex regions indicative of potential storm systems. In particular, comma-shaped cloud patterns may be automatically identified from the sequence of images, allowing the vortexes to be automatically identified in the comma-shaped cloud patterns. A descriptor for each vortex region may be constructed based on the visual and optical flow information and the historical storm data, including the step of using the historical storm data to construct a storm statistical density in geographical or temporal coordinates.

The extracted visual features and the historical meteorological data are used to identify candidate storm cells. As such, machine learning techniques are preferably used to classify the candidate cells into storm and stormless cells, using only candidates classified as storm cells to predict storms so as to eliminate "false positives." Other meteorological data and/or prediction models, and/or expert opinions, may be integrated into the system to improve the accuracy of the prediction.

BRIEF DESCRIPTION OF THE INVENTION

Figure 3A:
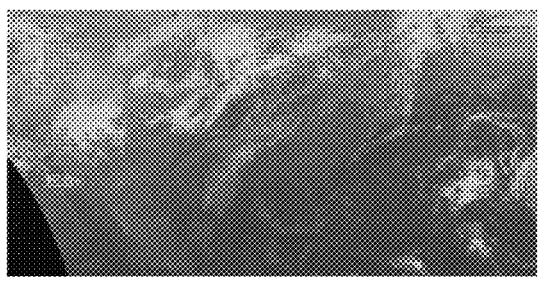
FIG. 3A shows the optical flow estimation result of a satellite image in respect to its previous frame in the sequence.
Figure 3B:
FIG. 3B shows the smoothed flow field (i.e., $\vec{F}_{t+5\Delta t}$) from the noisy estimation of FIG. 3A.
Figure 3C:
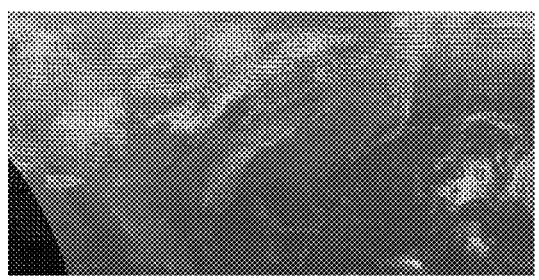
FIGS. 3C and 3D depict areas where plotted vectors overlap significantly as locations with high vorticity or divergence because the flows change directions quickly and collide with the neighboring vectors.
Figure 3D:
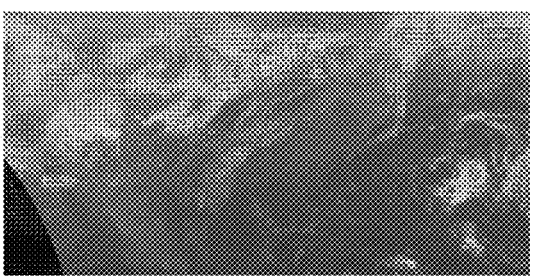
Figure 3E:
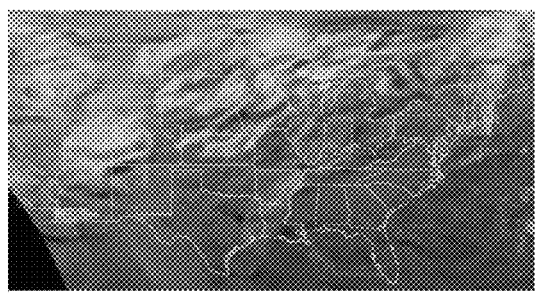
Figure 3F:
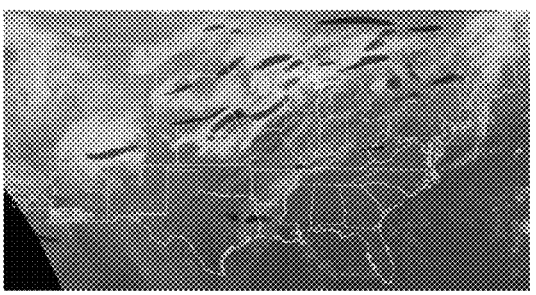
Figure 4:
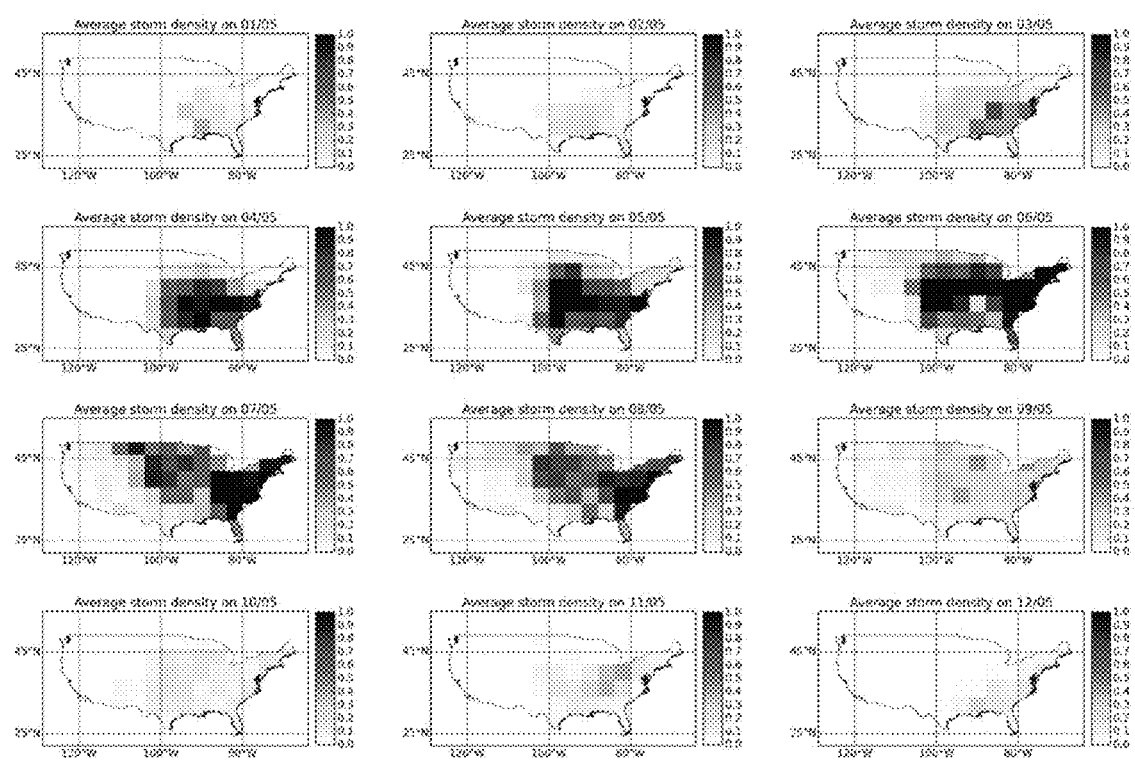

FIG. 3E visualizes the vorticity and Q-criterion of the flow field in FIG. 3C. In this Figure, pixels are tinted by the corresponding magnitude of vorticity, and different colors mean different directions of the local rotations;

FIG. 3F also visualizes the vorticity and Q-criterion of the flow field in FIG. 3C. In this Figure, the vortex cores where Q>0 are drawn in opaque colors inside of the surrounding high-vorticity regions;

FIG. 4 visualizes the storm priors (inside the U.S.) on twelve selected dates; and FIGS. 5A-5I illustrate satellite image sequences from three dates for case studies. For all cases, the first three consecutive frames of storm detection results are shown in these Figures.

DETAILED DESCRIPTION OF THE INVENTION

To address the weakness of numerical models, we have developed a computational weather forecasting system and method that takes advantage of both the global visual clues of satellite data and the historical records.

We analyze the satellite imagery because it provides important clues for meteorologists as they manually inspect global weather systems. Unlike conventional meteorological measures such as temperature, humidity, air pressure, and wind speed, which directly reflect the physical conditions at the sensors' locations, the visual information in the satellite images is captured remotely from the orbit, which offers a larger geographic coverage and finer resolution. The brightness in a satellite image indicates the reflectivity (or transparency) of the atmosphere, hence reveals the cloud appearance and distribution above the observed area. Manually interpreting such visual information, meteorologists can trace the evidence corresponding to certain weather patterns, particularly those related to severe storms. Moreover, many storm patterns are perceptible in the early stage of the storm development. As a result, the satellite imagery is highly helpful in weather forecasting.

Human eyes can effectively capture the visual patterns related to different types of weather events. The interpretation requires high-level understanding of the related meteorological knowledge, making it difficult for computers. However, there is an emerging need for a computerized way to automatically analyze the satellite images due to the broad spatial, temporal, and spectral coverage of the satellite data whose volume is too large to be processed manually. Researchers are seeking for computer vision algorithms to automatically process and interpret visual features from the satellite images, aiming at helping meteorologists make better weather analysis and forecasts. Traditional satellite image analysis techniques include cloud detection with complex backgrounds [1], cloud type classification [2], [3], detection of cloud overshooting top [4], [5], and tracking of cyclone movement [6]. These approaches, however, only capture local features that reflect the current condition of weather systems in a relatively small region, and overlook global visual patterns and their development over time, which provide powerful clues in weather forecasting.

With the development of advanced computer vision algorithms, some recent techniques put more focus on the analysis of cloud motion and deformation [7], [8], [9]. In these approaches, cloud motions are estimated to match and compare cloud patches between adjacent images in a sequence. Our invention also applies cloud motion estimation in image sequences. We believe it is novel because it extracts and models certain patterns of cloud motion, in addition to capturing the cloud displacement.

Our system extracts certain high-level visual features from satellite image sequences, which simulates meteorologists' cognitive process as they review the satellite images. In particular, we focus on the detection of mid-latitude storms in the Continental United States because of the data availability and emerging demands and interests for reliable storm prediction in this area. Experiments show these features we extract can indicate the occurrences of severe storms. Certainly the approach may be extended to other applications and geographical locations.

Historical satellite data archives as well as meteorological observations are available in recent years. Through analyzing large amount of past satellite images and inspecting the historical weather records, our system takes advantage of the big data to produce storm alerts based on an image sequence. The result provides an alternative prediction that can validate and complement the conventional forecasts. It can be embedded into an information fusion system, as suggested in [10], to cooperate with data and decisions from other sources and produce improved storm forecasts.

The Dataset

In our research, we adopt the data of the GOES-M satellite imagery for the entire year of 2008[2], which was in an active severe weather period containing abundant storm cases for us to analyze. The GOSE-M satellite moves on a geostationary orbit and was facing to the North America area during that year. In addition to the imagery data, each record contains navigation information, which helps us map each image pixel to its actual geo-location. The data is multi-spectral and contains five channels covering different ranges of wavelengths, among which we adopt channels 3 (6.5-7.0 µm) and 4 (10.2-11.2 µm) in our analysis because these two infrared channels are available all-day. Both channels are of 4 km resolution and the observation frequency is six records per hour, i.e., about ten minutes between two adjacent images. In order to let two adjacent images in a sequence have noticeable differences, we sample the original sequence and use a subsequence with two-frames-per-hour frame rate. In the rest of paper, every two adjacent images in a sequence are assumed to be 30 minutes apart unless specified otherwise.

[2] The satellite imagery is publicly viewable and the raw data archive can be requested on the website of US National Oceanic and Atmospheric Administration (NOAA).

Using the imagery and navigation data blocks in each raw data entry, we reconstruct satellite images by an equirectangular projection [11]. The pixel mapping from the raw imagery data to the map coordinate is computed by the navigation data with transformation defined in the NOAA ELUG manual [12]. The map resolution is set to be 4 km per pixel, which best utilizes the information of the raw data. We reconstruct the aligned images within the range of 60° W to 120° W in longitude and 20° N to 50° N in latitude, which covers the Continental US area. Hereafter all the image-related computation in our approach is performed on the reconstructed images, on which the geo-location of each pixel is directly accessible.

To relate the satellite data with severe storms, we retrieved the storm report data from the NOAA National Weather Service3, where the time and locations of all storms inside the United States since the year of 2000 are listed. The records act both as the ground-truth data in the training, and provide geographical and temporal statistical priors for the system in making decisions.

[3] http://www.spc.noaa.gov/climo/online/.

Storm-Related Visual Signatures

We selected several days in the year of 2008 that have frequent storm activities and let meteorologists review the satellite images on these days. They pointed out several types of important visual evidence they used to detect and locate severe storms, particularly during the development of the storms. We summarize these clues for developing an algorithm that simulates the cognitive process of the experts.

One important atmospheric activity that the clouds can imply is the jet stream. Jet streams are the fast flowing of the air at a high altitude of the atmosphere. They travel along the boundary between cold and warm air masses, where severe storms usually happen. A jet stream moves in a meandering path in the mid-latitude zone from west to east, which is caused by the Coriolis effect of the atmospheric circulation [13]. In the north hemisphere an elongated cold air mass with low pressure, namely a "trough", lies in the north side of a jet stream and to the south side there is warm and humid air with high pressure called "ridge". Because jet streams are flowing eastward, the east side of a trough, which is near the southwest-northeast directional part of a jet stream, is the region of active atmospheric activities, where cold and warm air masses collide.

Figure 1:
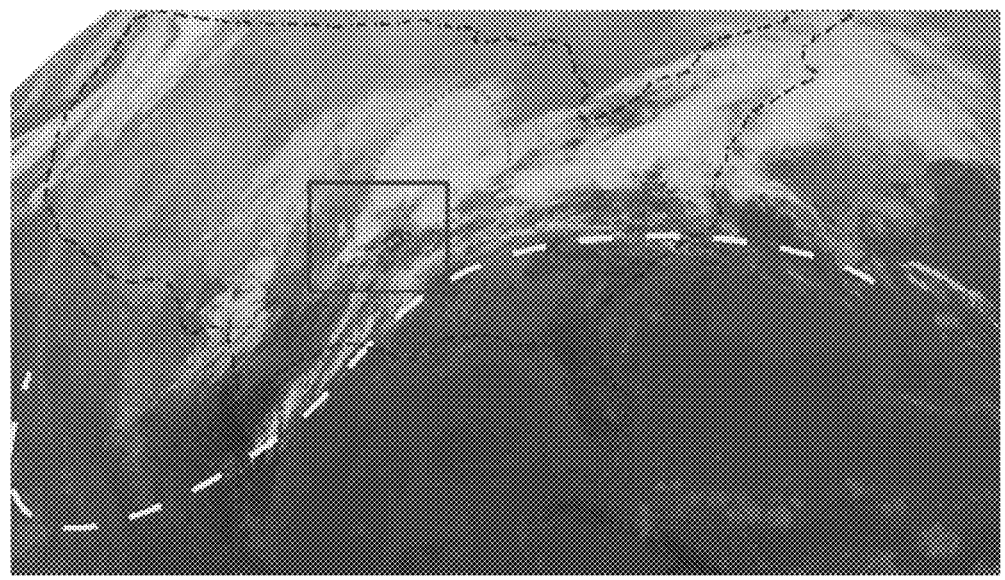
FIG. 1 shows a GOES-M image indicating how a severe thunderstorm started in the boxed area in the Figure two hours after the observation.

Though jet streams themselves are invisible, they can be detected by thick cumulus clouds gathering in trough regions. As a result, an elongated cloud covered area along the southwest-northeast direction is a useful large-scale clue for us to locate storms. FIG. 1 shows a GOES-M channel 4 image taken on Feb. 5, 2008. Clearly in the mid-latitude region the south boundary of the cloud band goes along a smooth curve, which indicates the jet stream (marked in dashed line). Usually the cloud-covered areas to the northwest side of such easily perceivable jet stream are susceptible to storms. In this case, a severe thunderstorm started in the boxed area in the figure two hours after the observation. Based on our experience, the majority of storms in North America follow similar cloud appearances to this example. As a result, jet stream is a basic clue for storm prediction [14].

A jet stream travels along a large-scale meandering path, whose wavelength is about 60 to 120 degrees of longitude long, as wide as a whole continent. The path is therefore usually referred to as the long wave. The trough bounded by the long wave only tells us a generally large region that is susceptible to storms. To locate individual storm cells more precisely, meteorologists seek for more detailed shape variations, namely short waves encapsulated in the long wave. Short waves reflect the local directional variation of a jet stream, usually in a scale of 1,000 to 4,000 kilometers. In a satellite image, short waves can be recognized by clouds in "comma shapes" [15], i.e., such cloud has a round shape due to the circular wind in its vicinity and a short tail towards the opposite direction of its translation. A comma-shaped cloud patch indicates a turbulent area of convection, which may trigger a storm if it lies on the boundary between cold and warm air masses. In FIG. 1, the marked storm area lies in the tail of a comma-shaped cloud patch, where the cold and warm air masses from both sides of the jet stream interact with each other to create turbulence and strong convective activities. To sum up, the short waves, or comma shapes, are the local cloud patterns that meteorologists utilize to locate and track mid-scale storms from satellite images.

The aforementioned visual cloud patterns can be detected from a single satellite image, though they are all results of the atmospheric motions. However, a single image is insufficient in delivering all the crucial information about the dynamics of storm systems. The cloud shapes are not always evident due to the nonrigid nature of clouds. In addition, the developing of storm systems, such as the cloud emerging, disappearing, and deformation, cannot be revealed unless different satellite images in a sequence are compared.

In practice, meteorologists need to review a series of images, rather than a single one, to make a forecast. They use the differences between the key visual clues (e.g., key points, edges) to track the development of storm systems and better locate the jet streams and comma shapes. Particularly, two types of motions are regarded crucial to the storm visual patterns: the global cloud translation with the jet stream, and the local cloud rotations producing comma shapes. We consider both types of motions in our storm detection work.

Storm Feature Extraction

Figure 2:
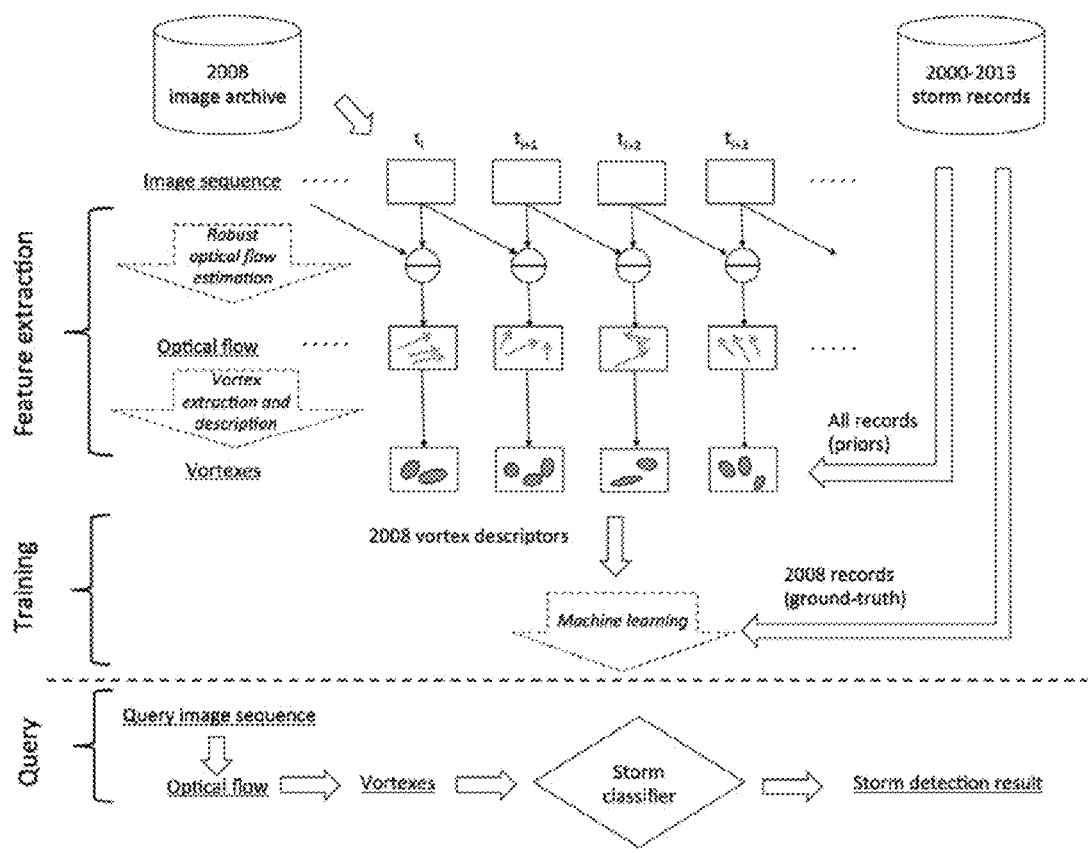
FIG. 2 illustrates how satellite image sequences are analyzed by the optical flow algorithm and turned into storm detection results by machine learning in the proposed system.

As introduced above, the cloud motion observed from a satellite image sequence is crucial for storm prediction. In our approach, we employ the optical flow between every two adjacent satellite images to capture the cloud motion and determine dynamic areas potentially to be hit by a storm. In particular, the rotation, divergence, and velocity of the flow in a local area are important to model the occurrence of storms. FIG. 2 illustrates the workflow of the analysis between two frames in a satellite image sequence. The system first estimates a dense optical flow field describing the difference between these two images. After being smoothed by the Navier-Stokes equation, the flow field is used to identify local vortex regions, which are potential storm systems. A descriptor is constructed for each vortex region based on the visual and optical flow information and the historical storm records. We describe these steps in detail in the following subsections.

Robust Optical Flow Estimation

Optical flow is a basic technique for motion estimation in image sequences. Given two images $I_t(x,y)$ and $I_{t+1}(x,y)$, the optical flow $F_t(x,y)=\{U_t(x,y),V_t(x,y)\}$ defines a mapping for each pixel g: $(x,y) \mapsto (x+U_t(x,y), y+V_t(x,y))$, so that $I_t(g(x,y)) \approx I_{t+1}(x,y)$. The vector field $I_t(x,y)$ can therefore be regarded as the pixel-wise motions from image $I_t(x,y)$ to $I_{t+1}(x,y)$. Several approaches for optical flow estimation have been proposed based on different optimization criteria [16], [17], [18]. In this work we adopt the Lucas-Kanade algorithm [19] to estimate a dense optical flow field between every two neighboring image frames.

Because the image sequences are taken from a geostationary satellite, what moves along a sequence are actually the clouds as the background remains static persistently. The nonrigid and highly dynamic nature of clouds makes the optical flow estimation noisy and less accurate. FIG. 3A shows the optical flow estimation result of a satellite image in respect to its previous frame in the sequence[4]. Though the result correctly reflects the general cloud motion, flows in local areas are usually noisy and do not precisely describe the local motions. As to be introduced later, the optical flow properties adopted in this work involve the gradient operation of the flow field. Thus it is important to get a reliable and smooth optical flow estimation. To achieve this goal, we both pre-process the images and post-process the estimation results. Before applying the Lucas-Kanade algorithm between two images, we first enhance both of them by the histogram equalization technique [20][5]. As a result, more fine details on the images are enhanced for better optical flow estimation.

[4] The optical flow is computed by information from both frames but drawn on the latter image frame.
[5] Each channel is enhanced separately. On a certain channel, a same equalization function (estimated from the first frame of the sequence) is applied to both images so that they are enhanced by a same mapping.

Then we smooth the estimated optical flow by applying an iterative update operation based on the Navier-Stokes equation for modeling fluid motions. Given a flow field $\vec{F}(x,y)$, the equation formulates the evolving of the flow over time t:

$$\frac{\partial \vec{F}}{\partial t} = (-\vec{F} \cdot \nabla)\vec{F} + v\nabla^2 \vec{F} + \vec{f}, \quad (1)$$

$$\text{where } \nabla = \left(\frac{\partial}{\partial x}, \frac{\partial}{\partial y}\right)$$

is the gradient operator, v is the viscosity of the fluid, and is the external force applied at the location (x,y).

The three terms in Eq. (1) correspond to the advection, diffusion, and outer force of the flow field, respectively. In the method introduced in [21], an initial flow field is updated to a stable status by iteratively applying these three transformations one-by-one. Compared with a regular low-pass filtering to the flow field, this approach takes into account the physical model of fluid dynamics, therefore better approximates the actual movements of a flow field. We adopt a similar strategy to smooth the optical flow in our case. The initial optical flow field $\vec{F}_t(x,y)$ is iteratively updated. Within each iteration the time is incremented by a small interval $\Delta t$, and there are three steps to get $\vec{F}_{t+\Delta t}(x,y)$ from $\vec{F}_t(x,y)$:

a. Add force: $\vec{F}_{t+\Delta t}^{(1)} = \vec{F}_t + \vec{f}\Delta t$;
 b. Advect: $\vec{F}_{t+\Delta t}^{(2)} = \text{adv}(\vec{F}_{t+\Delta t}^{(1)}, -\Delta t)$;
 c. Diffuse: $\vec{F}_{t+\Delta t} = \text{FFT}^{-1}(\text{FFT}(\vec{F}_{t+\Delta t}^{(2)})e^{-vk^2\Delta t})$.

The first step is simply a linear increment of the flow vectors based on the external force. In the second step, the advection operator adv(•) uses the flow $\vec{F}_{t+\Delta t}^{(1)}$ at each pixel (x,y) to predict its location $(x_{t-\Delta t}, y_{t-\Delta t})$ $\Delta t$ time ago, and updates $\vec{F}_{t+\Delta t}^{(2)}$ by $\vec{F}_{t+\Delta t}^{(1)}(x_{t-\Delta t}, y_{t-\Delta t})$. The last diffusion operation is a low-pass filter applied in the frequency domain, where k is the distance from a point to the origin, and the bandwidth of the filter is determined by the pre-defined fluid viscosity value and $\Delta t$. We do not enforce the mass conservation as the approach in [21] because the two-dimensional flow field corresponding to the cloud movement is not necessarily divergence free. In fact we use the divergence as a feature for storm detection (to be discussed later), so it is conserved in the estimation process of the stable optical flow.

After several iterations of the above update, the flow field converges to a stable status and is smoother. The iteration number is typically not large, and we find that the final result is relatively insensitive to the parameters v and $\Delta t$. In our system we set the iteration number to 5, the fluid viscosity v to 0.001, and time interval $\Delta t$ to 1. The noisy optical flow estimation from the previous stage is treated as the external force field $\vec{f}$, and initially $\hat{F}_t = 0$. FIG. 3B shows the smoothed flow field (i.e., $\vec{F}_{t+5\Delta t}$) from the noisy estimation (FIG. 3A). Clearly the major motion information is kept and the flow field is smoother for the subsequent analysis.

Flow Field Vortex Signatures

As introduced above, the rotation and divergence of local cloud patches are two key signatures for storm detection. They are computed from the robust flow field estimated based on two adjacent image frames. In a flow field, these two types of motions are embodied by the vorticity and divergence. Denote $\vec{F}(x,y)$ as the flow field, the vorticity of the field is defined as:

$$\vec{\omega} = \nabla \times \vec{F}(x, y) = \quad (2)$$

$$\left(\frac{\partial}{\partial x}, \frac{\partial}{\partial y}, \frac{\partial}{\partial z}\right) \times (U(x, y), V(x, y), 0) = \left(\frac{\partial V(x, y)}{\partial x} - \frac{\partial U(x, y)}{\partial y}\right)\vec{z};$$

and the divergence is defined as:

$$\text{div } \vec{F}(x, y) = \quad (3)$$

$$\nabla \cdot \vec{F}(x, y) = \left(\frac{\partial}{\partial x}, \frac{\partial}{\partial y}\right) \cdot (U(x, y), V(x, y)) = \frac{\partial U(x, y)}{\partial x} + \frac{\partial V(x, y)}{\partial y}.$$

It is proved that for a rigid body, the magnitude of vorticity at any point is twice of the angular velocity of its self-rotation [22] (the direction of the vorticity vector indicates the rotation's direction). In our case, even though the cloud is nonrigid, we take the vorticity at a certain point as an approximate description of the rotation of its neighboring pixels.

To better reveal the rotation and divergence, we apply the Helmholtz-Hodge Decomposition [23] to decompose the flow field to a solenoidal (divergence-free) component and an irrotational (vorticity-free) component. FIGS. 3C and 3D visualize these two components respectively. On both figures, areas where plotted vectors overlap significantly are locations with high vorticity or divergence because the flows change directions quickly and collide with the neighboring vectors.

The divergence-free component of the flow field is useful for detecting vortexes. On this component, we inspect the local deformation tensor $$\nabla \vec{F} = \begin{bmatrix} \partial U/\partial x & \partial V/\partial x \\ \partial U/\partial y & \partial V/\partial y \end{bmatrix},$$

which can be decomposed into the symmetric (strain) part $$S = \frac{1}{2}(\nabla \vec{F} + \nabla \vec{F}^T)$$

and the asymmetric (rotation) part $$\Omega = \frac{1}{2}(\nabla \vec{F} - \nabla \vec{F}^T).$$

The Q-criterion introduced by Hunt et al. [24] takes the different of their norm:

$$Q = \frac{1}{2}(\|\Omega\|^2 - \|S\|^2) = \frac{1}{4}\|\omega\|^2 - \frac{1}{2}\|S\|^2, \qquad (4)$$

where $\|\cdot\|$ is the Frobenius matrix norm. The Q-criterion measures the dominance of the vorticity. When Q>0, i.e., the vorticity component dominates the local flow, the corresponding location is regarded to be in a vortex core region. FIGS. 3E and 3F visualize the vorticity and Q-criterion of the flow field in FIG. 3C. In FIG. 3E, pixels are tinted by the corresponding magnitude of vorticity, and different colors mean different directions of the local rotations. In FIG. 3F the vortex cores where Q>0 are drawn in opaque colors inside of the surrounding high-vorticity regions. Clearly only locations with dominant vorticity component are selected by the Q-criterion. Also it is observed that these locations are more prone to be inside the storm area highlighted by yellow boundaries than the removed high-vorticity regions.

Storm Candidate Detection and Description

Typically regions where Q>0 are scattered small cells on the map. These cells correspond to the locations where rotating motion is more significant than translation. They are typically centers of vortexes. In fact, the neighboring pixels of each cell also have strong vorticity (though not dominant enough to be recognized as a vortex core) and are part of the vortex system. We include the neighboring pixels together with each Q>0 cell to describe a rotating cloud patch. In FIG. 3F, we color the neighboring pixels with similar vorticity intensities around each vortex core. In practice, the surrounding regions of vortex cores, which are near the boundaries of storm systems, are places where storms tend to occur. Expanding each vortex core in this way, we can better describe a storm system. In fact, vortex cores with their expansion areas compose comma shapes described above, so they are properly regarded as basic objects for storm detection.

Not all the regions extracted by the Q-criterion are related to storms[6]. To improve the detection accuracy, we adopted several crucial features to describe each candidate storm cell. These features are listed in Table. I. All features are pixel-wise (i.e., they have values on every pixel). A certain candidate cell $\psi t$ (extracted on date t) contains a set of pixels (extracted by the Q-criterion and vorticity expansion). We use the maximal (for Q) or mean (for the rest features) values of these features inside the cell as its descriptor:

$$X_{\psi_t} = \frac{1}{\|\psi_t\|}\Sigma_{(x,y)\in\psi_t}\Gamma_{\psi_t}(x, y), \qquad (5)$$

where $\|\psi_t\|$ is the area (i.e., number of pixels) of region $\psi_t$, and $$\Gamma_{\psi_t}(x, y) = \left(\max_{(x,y)\in\psi_t} Q(x, y, t), I^{(3)}(x, y, t), I^{(4)}(x, y, t),\right.$$

$$\left.\|\vec{F}(x, y, t)\|, \theta(x, y, t), \omega(x, y, t), div(x, y, t), \rho(x, y, t)\right)$$

is the feature vector for each pixel (the first dimension remains to be the maximal Q across the region).

[6]In FIG. 3F we have no record out of US, so we are not clear whether the vortex cores in the Canadian area triggered storms. But in the US continent there are several extracted regions not overlapping with any storm report.

The first seven dimensions listed in Table I are all visual features from the raw image or the optical flow analysis. The last feature $\rho$, on the other hand, is a temporal and geographic storm prior. It is obtained by inspecting the spatial and temporal distributions of the storms occurred in the Continental US from the year 2000 to the year 2013 using all the historical storm records. On each given date of a year (month and day), we count the occurrence of storms in each US states in the past 14 years ranging+/−5 days around the date[7]. Dividing the numbers by 154 (14×11), we obtain the average daily storm frequency of each state on that date. Denote the average storm frequency for state $R^8$ on date t as $\tau(R,t)$ and the area of the state as $\sigma(R)$. On date t, we assign each pixel (x,y) inside US with a storm prior $$\rho(x, y, t) = \frac{\tau(R_{x,y}, t)}{\sigma(R_{x,y})},$$

where $R_{x,y}$ is the state contains pixel $(x,y)^9$. FIG. 4 visualizes the storm priors (inside US) on twelve selected dates. Evidently the spatial and temporal distributions of storms are uneven. Therefore, they should also be considered as priors in the modeling stage.

[7]We assume the priors to be periodical with a period of one year. The prior on a given day is an average of all observations of neighboring days in all available periods (years). For example, all the records between February 1 and February 11 in the years from 2000 to 2013, totally 14×11=154 days, are used to compute the average geographical storm priors for February 6.
[8]Variable R is symbolic with 50 possible values, each of which represents a state in US.
[9]For pixels out of US, the prior is set to zero.

With $X_{\psi_t}$'s as defined in Eq. (5) for all candidate storm cells constructed, we use machine learning techniques to classify them into two classes, storm and stormless cells. Only candidates classified as storm cells are predicted as storms in our system. The false alarms are therefore suppressed.

TABLE I

FEATURES USED IN THE VORTEX CELL DESCRIPTION

| Notation[1] | Explanation |
|---|---|
| Q(x, y, t) | Q-criterion (see Eq. (4)) |
| $I^{(3)}$(x, y, t) | Image channel 3 brightness |
| $I^{(3)}$(x, y, t) | Image channel 4 brightness |
| $\|\vec{F}$(x, y, t)$\|$ | Magnitude of optical flow |
| θ(x, y, t) | Direction of optical flow |
| ω(x, y, t)[2] | Vorticity, on the solenoidal flow component |
| div(x, y, t) | Divergence on the irrotational flow component |
| ρ(x, y, t) | Storm prior computed from historical records |

Notes:
[1]Features have values on every pixel (x, y) and t is the date.
[2]The vorticity ω(x, y) is a vector perpendicular to the image plane. We therefore use the scaler ω(x, y) to represent the vorticity vector. ω(x, y) has same length as ω(x, y) and its sign indicates the direction of the vector. ω(x, y) < 0 if ω(x, y) is pointing toward the viewer

Storm System Classification and Detection

The vortex core regions with large Q values correspond to regions with active rotational cloud movements. However, they are not necessarily related to the occurrence of storms because the vorticity is only one aspect of the weather system. In practice, quite a few extracted vortexes do not trigger storms and generate unnecessary false alarms if we directly treat them as storm predictions. To enable computers to make reliable storm detection, we embed the candidate storm regions and their descriptors into a machine learning framework, performing training and classification on them. In fact, the visual signatures extracted above are already useful as assisting information for making weather forecasts because the signatures numerically measure some properties meteorologists perceive implicitly. We hope to further automate the process to help meteorologists make timely weather forecasts.

Construction of Training Data

With the GOES-M satellite data covering the North America area in 2008 and detailed storm reports in the same year, we can assign each candidate storm region in the Continental US with a ground-truth label. In each month of the year, we adopt image sequences on the first ten days as the source of training data. On each selected day, the satellite image sequence starts from 12:00 μm GMT (7:00 am US Eastern Time) and spans 8 hours with a 30-minute interval between every two adjacent frames. For every frame (except the first one), the image is processed in the way as introduced in Sec. II and a collection of candidate storm region descriptors are obtained.

The ground-truth label for each candidate region is assigned by overlaying it to the historical record. Denote the historical storm database as $\mathcal{D}$ and each storm entry as $(u_i,v_i,t_i)$ where $(u_i,v_i)$ is the location (latitude and longitude values in degrees) and $t_i$ is the starting time of the storm. Assume there is a vortex with geometric center $(u,v)$ and it is detected at time t, we assign the vortex with a positive (store-related) label if at least one record $(u_i,v_i,t_i) \in \mathcal{D}$ within 3 degrees of latitude and longitude exists between t−0.5 hr and t+2 hr (i.e., $|u_i-u|<3°$, $\|v-v\|<3°$, and $t_i \in [t-0.5$ hr, t+2 hr]); otherwise we assign the vortex with a negative (stormless) label. Because the storm records are all in the Continental US, we only keep the candidates inside of US for the training purpose, and discard the regions in other nearby areas (e.g., Canada, Mexico, Atlantic Ocean) because we do not have information to assign ground-truth labels to them.

On the 120 selected dates with 15 image frames spanning 8 hours on each day, our algorithm finds 22,313 vortex cores as candidate storm regions. Among them 5,876 are labeled as positive (storm), and 16,437 are negative (storm-less). In the training stage, we adopt all the positive cases and randomly sample 5,876 negative cases in order to ensure balanced training data.

Classification

We train a random forest [25] classifier by the training data. Random forest is an ensemble learning algorithm that makes predictions by combining the results of multiple individual decision trees trained from random subsets of the training data. We choose this approach because it is found to outperform a single classifier (e.g., SVM). In fact, this strategy resembles the ensemble forecasting [26] approach in the numerical weather prediction, where multiple numerical results with different initial conditions are combined to make a more reliable weather forecast. For both numerical and statistical weather forecasting approaches, the ensemble approaches are helpful to improve the prediction qualities.

The performance of the classifier is listed in Table II. We evaluate the classifier both on the training set by 10-fold cross validation and on a testing set. The testing set are generated from the eighteenth day to the twenty-second day of each month in 2008 in the same way the training data are constructed. These selected dates are far away from the dates where training samples are extracted, hence the testing data are not directly correlated with the training data (though the weather systems might have long-term relations). Evidently the classifier has consistent performances on both the training set and the testing set. The performance on the testing set is slightly weaker due to lack of training data in that time period.

TABLE II

CLASSIFICATION PERFORMANCE AND CONTRIBUTIONS OF VISUAL FEATURES AND HISTORICAL PRIORS

| | | All features | Visual only | Prior only |
|---|---|---|---|---|
| Training set (cross validation) | Overall | 83.3% | 68.8% | 76.1% |
| | Sensitivity | 89.6% | 67.4% | 74.8% |
| | Specificity | 76.9% | 70.3% | 77.3% |
| Testing set | Overall | 80.3% | 67.4% | 77.3% |
| | Sensitivity | 82.1% | 47.2% | 77.4% |
| | Specificity | 80.2% | 67.7% | 71.2% |

Note:
Training set contains 5,876 storm and 5,876 stormless votex cells from 120 days in 2008. 10-fold cross validation is performed in the evaluation. Testing set contains 2,706 storm cells and 7,773 stormless cells from 60 days far away from the training data. The feature vector for each vortex is composed by both visual features and storm priors (see Section II-C). Beside the merged features (results shown in the first column), we test the two types of features separately (results shown in the second and third columns).

To demonstrate the effect of including historical geographic storm priors in the classification, we also train and test the random forest classifiers only on the visual features and the storm priors respectively. The results are shown in Table II. Clearly none of the visual features and the priors' standalone performs well. Combing visual features with the storm priors significantly enhances the classification performance.

It is necessary to emphasize that the classification is performed on those extracted candidate vortex regions where local clouds are rotating. Most of the cloud-covered regions on the satellite images without dominant rotational motions are already eliminated (or classified as non-storm cases) before the algorithm proceeds to the classification stage. Therefore, in practice the system achieves a good overall precision for detecting the storms. Such fact is reflected by the case studies in the next subsection. In addition, the classification results for individual vortex regions can be further corrected and validated based on their spatial and temporal neighboring relationships.

Case Study

Using the vortex core extraction algorithm introduced in Section II and the classifier trained above, we can automate the process of storm detection from satellite image sequences. Here we present three case studies to show the effectiveness of this approach in different scenarios.

We choose satellite image sequences from three dates for case studies[10]. For all cases, the first three consecutive frames of storm detection results are shown in FIG. 5A-5I. The results are consistent along the following frames in all cases, hence these three frames are sufficient to demonstrate the result for each case. On the displayed images, detected storm systems are filled in red or green color (based on the vorticity vectors' directions). Those vortex regions which are detected from the images but classified as negative samples are not filled in color but stroked in blue lines.

[10] All dates are not used for training the classifier

Figure 5A:
Figure 5B:
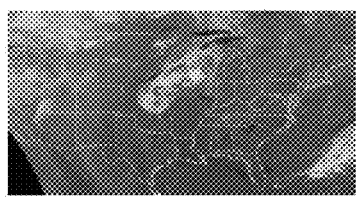
Figure 5C:
Figure 5D:
Figure 5E:
Figure 5F:

The first example shown in FIGS. 5A-5C was from Jun. 18, 2008. Several cloud systems can be seen on the satellite images. Based on the historical records, almost all of them caused storms in several states across the country. Our algorithm captures all the major vortexes in the satellite image sequence, and correctly categories most of them as storms. As a result, highlighted storm systems are frequently observed in all the frames. Storm alerts will therefore be triggered in the areas covered by them. The second case (FIGS. 5D-5F) is a strongly negative case, in which neither major cloud nor cloud motion can be detected. On such clear days it is relatively straightforward for the algorithm to make correct decisions during the storm feature extraction stage because few vortexes can be observed and extracted from the image sequence.

Figure 5G:
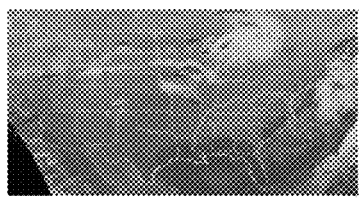
Figure 5H:
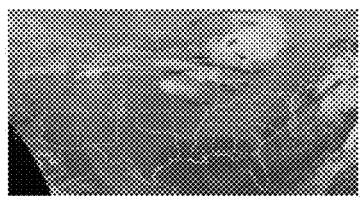
Figure 5I:
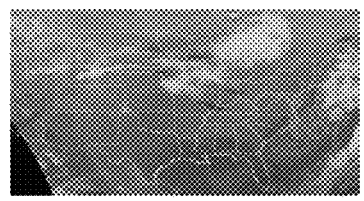

Images from Mar. 25, 2008 are shown in FIGS. 5G-5I. In the images we can also observe several cloud systems above the Continental US area as in the first case. Some of them look dominant but in fact there is no severe storm reported on that day based on the historical records. In the first stage, our algorithm detected several vortex cores from the optical flow between every two frames. However, most of the vortex cores are rejected by the classifier and not recognized as storms in the second stage. Compared to the second case, evident clouds and their rotations are perceived here, still our approach makes correct decisions. This demonstrates the effectiveness and robustness of the algorithm.

CONCLUSIONS AND FUTURE WORK

We presented a new storm detection system and method that locates storm visual signatures from satellite images. The method automatically analyzes the visual features from satellite images and incorporates the historical meteorological records to make storm predictions. Different from traditional ways of weather forecasting, our approach makes use of only the visual information from images to extract high-level storm signatures. Without using any sensory measurements commonly used in numerical weather forecasting, such as temperature or air pressure, the algorithm instead takes advantage of big data. It uses historical storm reports and satellite image archives in the recent years to learn the correspondences between visual image signatures and the occurrences of current and future storms. Experiments and case studies indicate that the algorithm is effective and robust.

Properties of optical flows between every two adjacent images in a sequence are the basic visual clues adopted in our work. The algorithm can estimate robust and smooth optical flows between two images, and determine the rotations in the flow field. Unlike numerical weather forecasting method that are sensitive to noise and initial conditions, our approach can consistently detect reliable visual storm clues hours before the beginning of a storm. Therefore, the results are useful for weather forecasts, especially the severe storm forecast. Future work will be done to evaluate the prediction value of the vision-based approach, i.e., we will quantify how long in advance the algorithm can make sufficiently confident predictions.

The application of historical storm records and machine learning boosts the performance of the storm extraction algorithm. Standalone vortex detection from the optical flow is insufficient in making reliable predictions. The statistical model trained from historical meteorological data, together with the satellite image visual features, further selects the extracted vortexes and removes vortexes not related to storms. In the current algorithm, the storm detection are based on individual vortex regions. In fact, vortexes tend to densely appear in storm systems both temporally and geographically. Therefore, taking into account nearby vortexes within a frame and tracking stout' systems across a sequence can improve the overall reliability of the system. In particular, tracking the development of a storm system will be helpful for analyzing the future trend of the storm. This problem is nontrivial because the storm systems (clouds) are nonrigid and highly variant, and same vortex cores in a storm system are not always detectable along a sequence. Future work needs to tackle the problem of nonrigid object tracking to better make use of the temporal information in the satellite image sequences.

It should be emphasized that weather systems are highly complex and chaotic, hence it is always a challenging task to make accurate weather forecasts. Still we believe the disclosed approach is useful and valuable because it provides forecasts in an aspect independent from the numerical approaches. The purpose for developing the new algorithm is not to replace the current weather forecasting models. Instead it is to produce additional independent predictions that complement and improve the current forecasts. As a result, we will also focus in our future work on how to integrate information from multiple data sources and predictions from different models to produce more reliable and timely storm forecasts.

REFERENCES

[1] A. N. Srivastava and J. Stroeve, "Onboard detection of snow, ice, clouds and other geophysical processes using kernel methods," in *Proceedings of the ICML Workshop on Machine Learning Technologies for Autonomous Space Applications*, 2003.

[2] Y. Hong, "Precipitation estimation from remotely sensed imagery using an artificial neural network cloud classification system," *Journal of Applied Meteorology*, vol. 43, pp. 1834-1852, 2004.

[3] A. Behrangi, K. Hsu, B. Imam, and S. Sorooshian, "Daytime precipitation estimation using bispectral cloud classification system," *Journal of Applied Meteorology and Climatology*, vol. 49, pp. 1015-1031, 2010.

[4] K. Bedka, J. Brunner, R. Dworak, W. Feltz, J. Otkin, and T. Greenwald, "Objective satellite-based detection of overshooting tops using infrared window channel brightness temperature gradients," *Journal of Applied Meteorology and Climatology*, vol. 49, no. 2, pp. 181-202, 2010.

[5] K. M. Bedka, "Overshooting cloud top detections using msg seviri infrared brightness temperatures and their relationship to severe weather over europe," *Atmospheric Research*, vol. 99, no. 2, pp. 175-189, 2011.

[6] S.-S. Ho and A. Talukder, "Automated cyclone discovery and tracking using knowledge sharing in multiple heterogeneous satellite data," in *Proceedings of the 14th ACM SIGKDD International Conference on Knowledge Discovery and Data Mining*, 2008, pp. 928-936.

[7] T. Zinner, H. Mannstein, and A. Tafferner, "Cb-tram: Tracking and monitoring severe convection from onset over rapid development to mature phase using multichannel meteosat-8 seviri data," *Meteorology and Atmospheric Physics*, vol. 101, no. 3-4, pp. 191-210, 2008.

[8] C. Keil and G. C. Craig, "A displacement and amplitude score employing an optical flow technique," Weather and Forecasting, vol. 24, no. 5, pp. 1297-1308, 2009.

[9] D. Merk and T. Zinner, "Detection of convective initiation using meteosat seviri: Implementation in and verification with the tracking and nowcasting algorithm cb-tram," Atmospheric Measurement Techniques Discussions, vol. 6, pp. 1771-1813, 2013.

[10] A. McGovern, A. Kruger, D. Rosendahl, and K. Droegemeier, "Open problem: dynamic relational models for improved hazardous weather prediction," in *Proceedings of ICML Workshop on Open Problems in Statistical Relational Learning*, vol. 29, 2006.

[11] J. P. Snyder, *Map Projections—A Working Manual*. USGPO, 1987, no. 1395.

[12] "Earth location user's guide (elug). rev. 1, noss/osd3-1998-015r1ud0," Tech. Rep. NOAA/NESDIS DRL 504-11, 1998.

[13] R. G. Barry and R. J. Chorley, *Atmosphere, Weather and Climate*. Routledge, 2009.

[14] J. G. Charney, "The dynamics of long waves in a baroclinic westerly current," *Journal of Meteorology*, vol. 4, no. 5, pp. 136-162, 1947.

[15] T. N. Carlson, "Airflow through midlatitude cyclones and the comma cloud pattern," *Monthly Weather Review*, vol. 108, no. 10, pp. 1498-1509, 1980.

[16] B. K. Horn and B. G. Schunck, "Determining optical flow," in 1981 *Technical Symposium East*, 1981, pp. 319-331.

[17] B. D. Lucas and T. Kanade, "An iterative image registration technique with an application to stereo vision," in *Proceedings of the International Joint Conferences on Artificial Intelligence*, vol. 81, 1981, pp. 674-679.

[18] J. S. Pérez, E. Meinhardt-Llopis, and G. Facciolo, "Tv-l1 optical flow estimation," *Image Processing On Line*, vol. 2013, pp. 137-150, 2013.

[19] J. Bouguet, "Pyramidal implementation of the affine Lucas kanade feature tracker description of the algorithm," Intel Corporation, vol. 5,2001.

[20] T. Acharya and A. K. Ray, *Image Processing: Principles and Applications*, 2005.

[21] J. Stam, "Stable fluids," in *Proceedings of the 26th Annual Conference on Computer Graphics and Interactive Techniques*, 1999, pp. 121-128.

[22] S. I. Green, *Fluid Vortices: Fluid Mechanics and Its Applications*. Springer, 1995, vol. 30.

[23] G. B. Arfken and H. J. Weber, *Mathematical Methods for Physicists*, 4th ed. Academic Press: San Diego, 1995.

[24] J. C. Hunt, A. Wray, and P. Moin, "Eddies, streams, and convergence zones in turbulent flows," in *Studying Turbulence Using Numerical Simulation Databases*, 2, vol. 1, 1988, pp. 193-208.

[25] L. Breiman, "Random forests," *Machine learning*, vol. 45, no. 1, pp. 5-32, 2001.

[26] F. Molteni, R. Buizza, T. N. Palmer, and T. Petroliagis, "The ecmwf ensemble prediction system: Methodology and validation," *Quarterly Journal of the Royal Meteorological Society*, vol. 122, no. 529, pp. 73-119, 1996.

The invention claimed is:

1. A method of automatic storm detection or prediction based on historical meteorological data and satellite image sequences, for validating and complementing conventional forecasts, the historical meteorological data includes historical storm reports and satellite image archives for historical weather, comprising the steps of:
providing, a digital computer;
receiving, at the digital computer, a sequence of satellite images involving a geographical region;
receiving, at the digital computer, historical meteorological data associated with the geographical region;
executing an algorithm on the digital computer to perform the following operations:
automatically extract visual features indicative of storm signatures from the sequence of satellite images;
learn the correspondences between the visual storm signatures and the occurrences of current and future storms based on the historical meteorological data; and
detect or predict storms in the geographical region using the learned correspondences.

2. The method of claim 1, wherein the correspondence is a statistical model trained based on the historical meteorological data.

3. The method of claim 1, including the step of estimating cloud motion in the image sequences to determine dynamic areas having a storm potential.

4. The method of claim 3, wherein the step of estimating cloud motion in the image sequences includes automatically analyzing the optical flow between adjacent satellite images or among a contiguous sequence of satellite images.

5. The method of claim 4, including the step of using rotation, divergence, and/or velocity of the optical flow in a local area to model potential storm patterns.

6. The method of claim 1, including the step of extracting and fitting local cloud motions from image sequences to model storm-related cloud patches.

7. The method of claim 1, including the step of identifying a dense optical flow field between two adjacent images or within a contiguous sequence of the satellite images.

8. The method of claim 7, including the step of using the flow field to identify local vortex regions indicative of potential storm systems.

9. The method of claim 8, including the step of constructing a descriptor for each vortex region based on the visual and optical flow information and the historical storm data.

10. The method of claim 9, including the step of using the historical storm data to construct a storm statistical density in geographical or temporal coordinates.

11. The method of claim 1, including the steps of:
using the extracted visual features and the historical meteorological data to identify candidate storm cells;
using machine learning techniques to classify the candidate cells into storm and stormless cells; and
using only candidates classified as storm cells to predict storms.

12. The method of claim 1, including the step of automatically identifying comma-shaped cloud patterns from the sequence of images.

13. The method of claim 12, including the step of automatically extracting vortexes in the comma-shaped cloud patterns.

14. The method of claim 1, including the step of integrating other meteorological data and/or prediction models to improve the accuracy of the prediction.

15. The method of claim 1, including the step of integrating expert opinions to improve the accuracy of the prediction.

* * * * *